(12) United States Patent
Jo et al.

(10) Patent No.: US 9,356,274 B2
(45) Date of Patent: May 31, 2016

(54) ELECTRODE ASSEMBLY AND RECHARGEABLE BATTERY USING THE SAME

(75) Inventors: Yun-Kyung Jo, Jyunggi-do (KR); Chan-Jung Kim, Jyunggi-do (KR); Suk-Jung Son, Jyunggi-do (KR); Mi-Young Jang, Jyunggi-do (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 1351 days.

(21) Appl. No.: 13/064,242

(22) Filed: Mar. 14, 2011

(65) Prior Publication Data

US 2011/0244284 A1    Oct. 6, 2011

(30) Foreign Application Priority Data

Apr. 1, 2010  (KR) .................. 10-2010-0030072

(51) Int. Cl.
- *H01M 10/36* (2010.01)
- *H01M 2/16* (2006.01)
- *H01M 10/04* (2006.01)
- *H01M 10/052* (2010.01)
- *H01M 10/0587* (2010.01)
- *H01M 10/42* (2006.01)

(52) U.S. Cl.
CPC ........ *H01M 2/1686* (2013.01); *H01M 10/0431* (2013.01); *H01M 10/052* (2013.01); *H01M 10/0587* (2013.01); *H01M 10/4235* (2013.01); *Y02T 10/7011* (2013.01)

(58) Field of Classification Search
None
See application file for complete search history.

(56) References Cited

U.S. PATENT DOCUMENTS

| | | |
|---|---|---|
| 5,075,958 A | 12/1991 | Kelemen et al. |
| 5,741,608 A | 4/1998 | Kojima et al. |
| 2007/0048615 A1* | 3/2007 | Nagayama et al. ........... 429/246 |
| 2008/0107961 A1* | 5/2008 | Jeong et al. .................... 429/163 |
| 2009/0148762 A1 | 6/2009 | Kasamatsu et al. |
| 2009/0297929 A1* | 12/2009 | Uchida ............................ 429/94 |
| 2009/0325058 A1* | 12/2009 | Katayama et al. ............ 429/142 |

FOREIGN PATENT DOCUMENTS

| | | | |
|---|---|---|---|
| JP | 09-161757 A | | 6/1997 |
| JP | 2002-050325 A | | 2/2002 |
| JP | 2003-297331 A | | 10/2003 |
| JP | 2008108492 A | * | 5/2008 |
| KR | 10-2008-0086437 A | | 9/2008 |
| KR | 10-2009-0008060 A | | 1/2009 |
| WO | WO 03/038928 A1 | | 5/2003 |
| WO | WO 2009/011517 A1 | | 1/2009 |

OTHER PUBLICATIONS

Korean Notice of Allowance in KR 10-2010-0030072, dated May 1, 2012 (Jo, et al.).

* cited by examiner

*Primary Examiner* — Barbara Gilliam
*Assistant Examiner* — Stephan Essex
(74) *Attorney, Agent, or Firm* — Lee & Morse, P.C.

(57) ABSTRACT

An electrode assembly includes a positive electrode including a positive electrode current collector and a positive electrode active material layer on the positive electrode current collector, a negative electrode including a negative electrode current collector and a negative electrode active material layer on the negative electrode current collector, and a separator between the positive and negative electrodes, the separator including a heat-resistive unit and a lubrication unit, the heat-resistive unit having a heat-resistive material, and the lubrication unit being at an inner front end of the spirally winding separator and having a friction coefficient that is lower than that of the heat-resistive unit.

19 Claims, 10 Drawing Sheets

ELECTRODE ASSEMBLY AND RECHARGEABLE BATTERY USING THE SAME

BACKGROUND

1. Field

The described technology relates generally to an electrode assembly for a rechargeable battery. More particularly, the described technology relates generally to an electrode assembly having an improved separator and a rechargeable battery using the same.

2. Description of the Related Art

Unlike a primary battery, a rechargeable battery can be charged and discharged. Low-capacity rechargeable batteries are used for portable compact electronic apparatuses, e.g., mobile phones, notebook computers, and camcorders, and high-capacity rechargeable batteries are widely used as a power source, e.g., for driving a motor of a hybrid vehicle, etc.

The rechargeable battery includes an electrode assembly and a case in which the electrode assembly is installed, and the case may have a cylindrical shape, a prismatic shape, a pouch shape, etc. The electrode assembly includes a positive electrode, a negative electrode, and a separator disposed between the positive and negative electrodes. Here, the separator separates the positive electrode and the negative electrode to prevent a short-circuit therebetween, and absorbs electrolyte required for a battery reaction to maintain high ion conductivity.

The above information disclosed in this Background section is only for enhancement of understanding of the background of the described technology and therefore it may contain information that does not form the prior art that is already known in this country to a person of ordinary skill in the art.

SUMMARY

Embodiments are directed to an electrode assembly and a rechargeable battery including the same, which substantially overcome one or more of the problems due to the limitations and disadvantages of the related art.

It is therefore a feature of an embodiment to provide an electrode assembly with a separator structure capable of being easily, spirally wound.

It is therefore another feature of an embodiment to provide an electrode assembly with a separator structure having an improved stability.

It is yet another feature of an embodiment to provide a rechargeable battery with an electrode assembly having one or more of the above features.

At least one of the above and other features and advantages may be realized by providing an electrode assembly, including a positive electrode including a positive electrode current collector and a positive electrode active material layer on the positive electrode current collector, a negative electrode including a negative electrode current collector and a negative electrode active material layer on the negative electrode current collector, and a separator between the positive and negative electrodes, the separator including a heat-resistive unit and a lubrication unit, the heat-resistive unit having a heat-resistive material, and the lubrication unit being at an inner front end of the spirally winding separator and having a friction coefficient that is lower than that of the heat-resistive unit.

The heat-resistive material may be an aramid. The heat-resistive material may include at least one ceramic, PVDF, and PVDF-HFP.

The separator may include a separator member and a first heat-resistive layer on a portion of the separator member, the first heat-resistive layer being in the heat-resistive unit, and the separator member including a polymeric porous membrane. The lubrication unit may include a portion of the separator member without the first heat-resistive layer. Further, the electrode assembly may include a lubrication layer in the lubrication unit, the lubrication layer having a friction coefficient that is lower than that of the separator member.

The separator may further include a second heat-resistive layer on a portion of the separator member, the first and second heat-resistive layers being on opposite surfaces of the separator member, and the lubrication unit may include a first lubrication unit and a second lubrication unit, the first lubrication unit including a portion of the separator member without the first or second heat-resistive layers, and he second lubrication unit including only one of the first and second heat-resistive layers. The heat-resistive material may be embedded in the heat-resistive unit, and a friction coefficient of the lubrication unit may be lower than that of the heat-resistive unit by about 0.1 to about 0.3.

At least one of the above and other features and advantages may also be realized by providing a rechargeable battery, including an spirally winding electrode assembly having a positive electrode, a negative electrode, and a separator between the positive and negative electrodes, a case in which the electrode assembly is installed, and a terminal electrically connected to the electrode assembly and externally protruding from the case, wherein the separator includes a heat-resistive unit and a lubrication unit, the heat-resistive unit having a heat-resistive material, and the lubrication unit being at an inner front end of the separator and having a friction coefficient that is lower than that of the heat-resistive unit.

The heat-resistive material may be an aramid. The heat-resistive material may include at least one of ceramic, PVDF, and PVDF-HFP.

The separator may include a separator member and a heat-resistive layer on a portion of the separator member, the heat-resistive layer being in the heat-resistive unit, and the separator member including a polymeric porous membrane. The lubrication unit may include a portion of the separator member without the first heat-resistive layer. A lubrication layer having a friction coefficient that is lower than that of the separator member may be formed in the lubrication unit.

The separator may include a separator member formed with a polymer porous membrane, a first heat-resistive layer formed at one side of the separator member, and a second heat-resistive layer formed at the other side of the separator member, The first and second heat-resistive layers may be formed in the heat-resistive unit, and the lubrication unit may include a first lubrication unit where the first and second heat-resistive layers are not formed and a second lubrication unit where a heat-resistive layer is formed only at one side of the separator member. A heat-resistive material may be embedded in the heat-resistive unit, and a friction coefficient of the lubrication unit may be lower than that of the heat-resistive unit by 0.1 to 0.3.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0030072, filed on Apr. 1, 2010, in the Korean Intellectual Property Office, and entitled: "Electrode Assembly and Rechargeable Battery Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
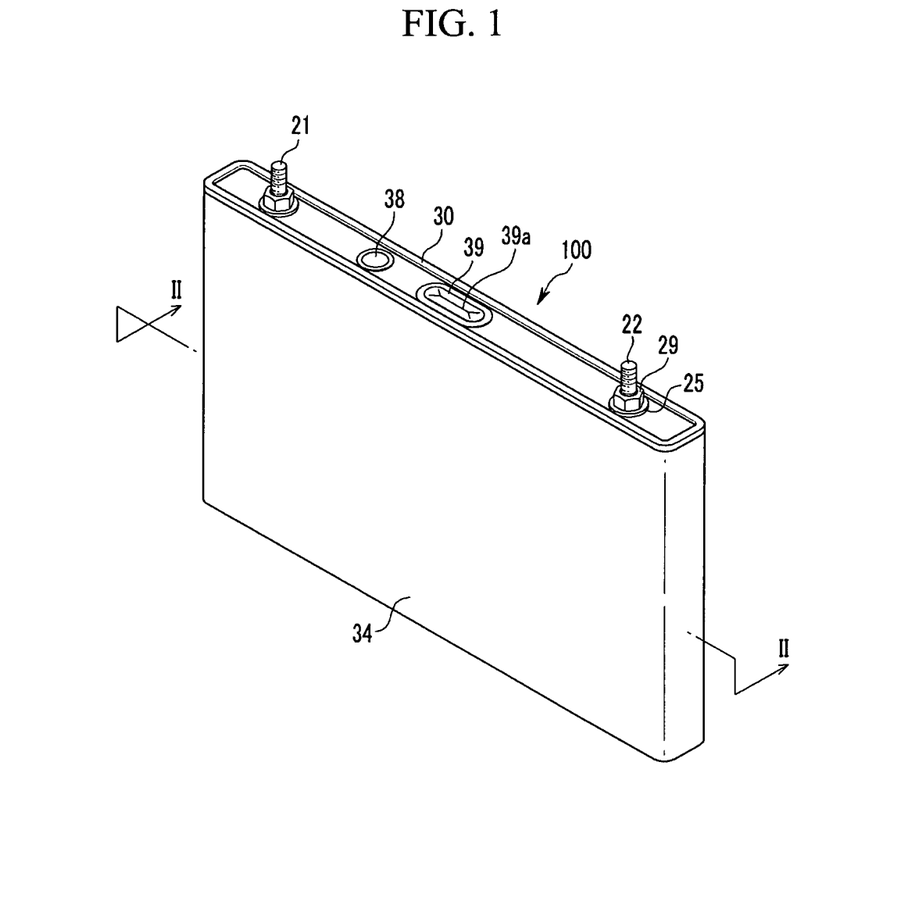
FIG. 1 illustrates a perspective view of a rechargeable battery according to a first exemplary embodiment.
Figure 2:
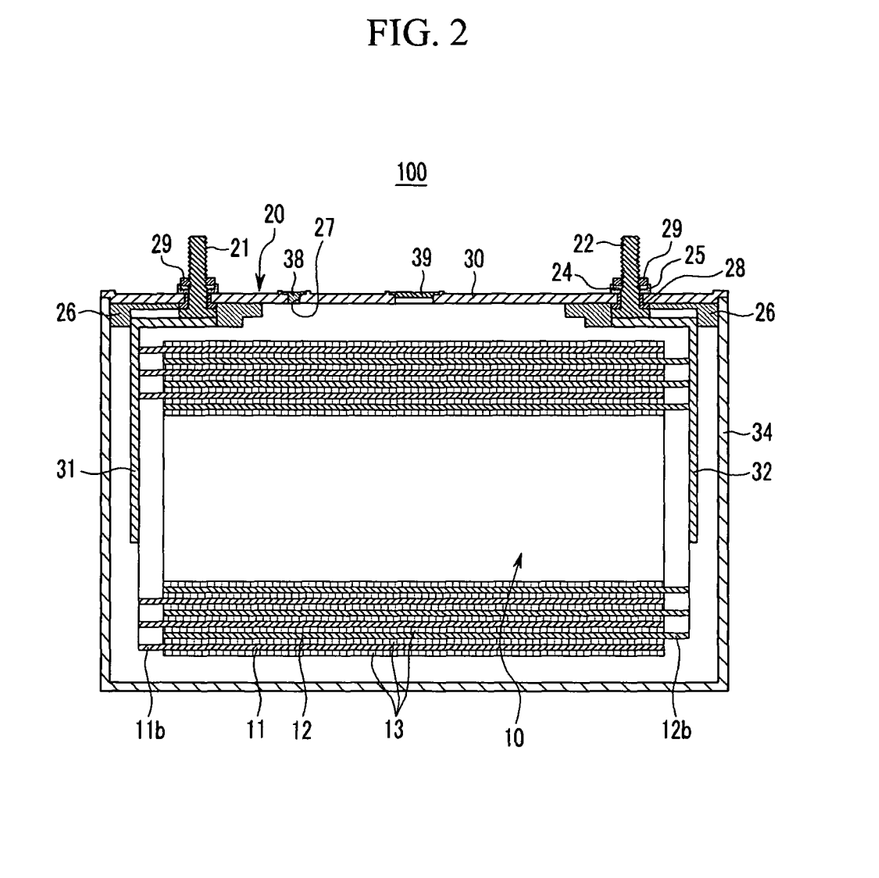
FIG. 2 illustrates a cross-sectional view of FIG. 1, taken along line II-II.

FIG. 1 illustrates a perspective view of a rechargeable battery according to a first exemplary embodiment, and FIG. 2 illustrates a cross-sectional view of FIG. 1 along line II-II. Referring to FIG. 1 and FIG. 2, a rechargeable battery 100 may include an electrode assembly 10 performing charging and discharging, a case 34 in which the electrode assembly 10 is installed, and a cap assembly 20 connected to an opening of the case 34.

The rechargeable battery 100 according to the first exemplary embodiment is exemplarily described as a lithium ion battery. However, the example embodiments are not limited thereto and may be applied to various types of batteries, e.g., a lithium polymer battery.

The case 34 forms an entire external appearance of the rechargeable battery 100, and provides a space for installing the electrode assembly 10 therein. For example, the case 34 may be formed to have a cuboid shape with an opening at one side thereof for receiving a cubically-shaped electrode assembly 10. However, example embodiments are not limited thereto, e.g., the case 34 may be formed with a pouch shape. For example, the case 34 may be formed of metal, e.g., aluminum, an aluminum alloy, nickel-plated steel, and/or a pouched laminate film The cap assembly 20 may include a plate-shaped cap plate 30. The cap plate 30 may be coupled to the opening formed in the case 34. A sealing cap 38 may be provided in an electrolyte solution injection hole 27 formed in the cap plate 30. In addition, a vent plate 39 with a notch 39a may be positioned in a vent hole provided in the cap plate 30, so the vent plate 39 may open or close under a predetermined pressure.

Positive and negative electrode terminals 21 and 22 may be electrically connected to the electrode assembly 10, and the positive and negative terminals 21 and 22 may protrude to the outside of the case 34. The positive and negative terminals 21 and 22 may pass through the cap plate 30. The positive and negative terminals 21 and 22 may have pillar shapes protruding through the cap plate 30 and may include respective terminal flanges supported at the bottom of the cap plate 30. Outer circumferences of the upper pillars protruding to the outside of the cap plate 30 may be screw-processed. In addition, nuts 29 may be coupled to the positive and negative electrode terminals 21 and 22 while supporting them from the top side.

Upper and lower gaskets 25 and 28 may be installed between the positive and negative electrode terminals 21 and 22 and the cap plate 30, so as to seal and insulate the electrode terminals 21 and 22 and the cap plate 30 from each other. Washers 24 for buffering a combining force may be formed on the upper gaskets 25. The positive electrode terminal 21 may be electrically connected to a positive electrode 11 via a first lead tab 31, and the negative terminal 22 may be electrically connected to a negative electrode 12 via a second lead tab 32.

A lower insulating member 26 may be disposed under the cap plate 30, and the bottom ends of the electrode terminals 21 and 22 and the top ends of the lead tabs 31 and 32 may be inserted into the lower insulating member 26. With this structure, the first lead tab 31 may electrically interconnect the positive electrode terminal 21 and the positive electrode 11, and the second lead tab 32 may electrically interconnect the negative electrode terminal 22 and the negative electrode 12.

Figure 3:
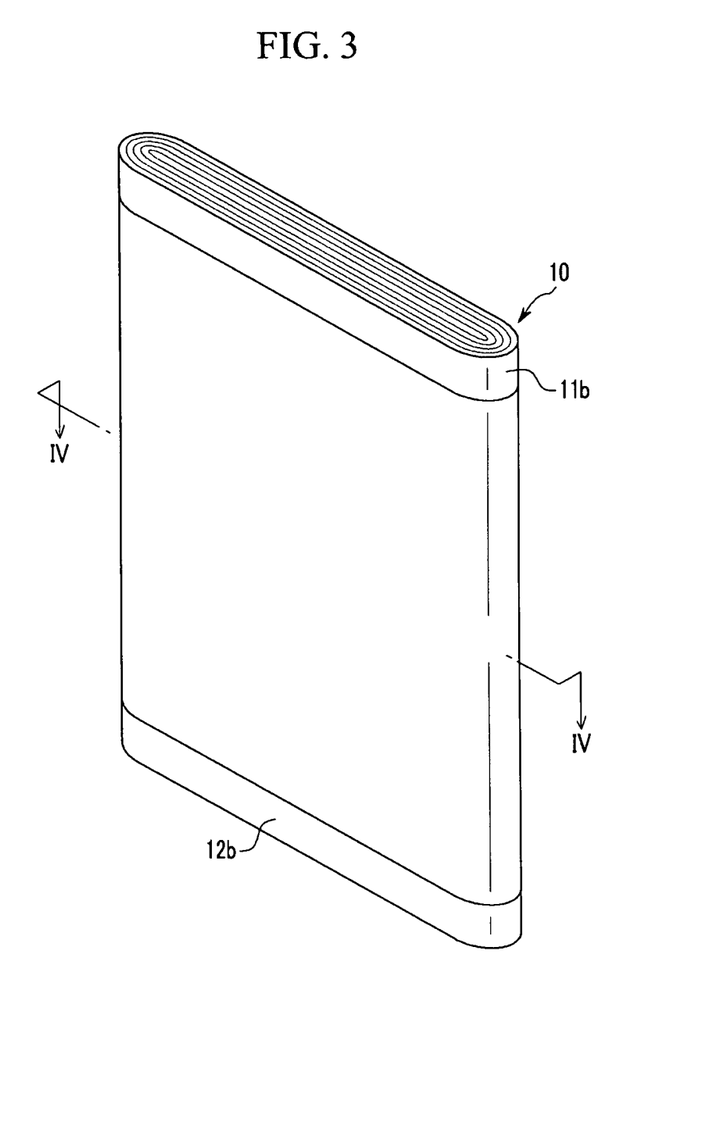
FIG. 3 illustrates a perspective view of an electrode assembly according to the first exemplary embodiment.
Figure 4:
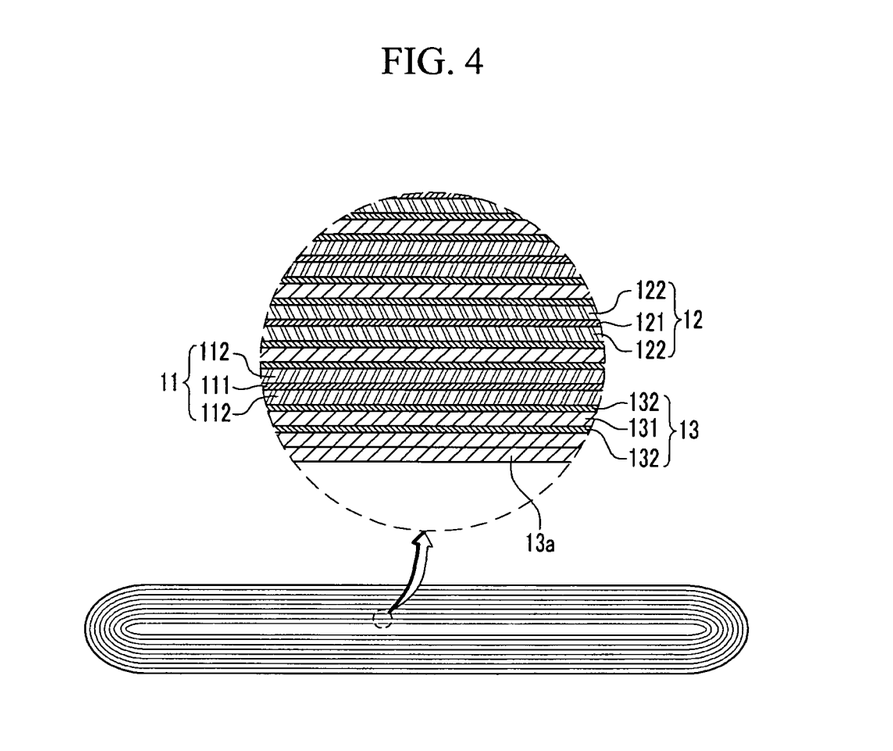
FIG. 4 illustrates a cross-sectional view of FIG. 3, taken along line IV-IV.

FIG. 3 illustrates a perspective view of the electrode assembly 10 according to the first exemplary embodiment, and FIG. 4 illustrates a cross-sectional view of FIG. 3 along line IV-IV. Referring to FIG. 3 and FIG. 4, the positive electrode 11, the negative electrode 12, and a separator 13 may be band-shaped and elongated along one direction. The separator 13 may be disposed between the positive and negative electrodes 11 and 12, so the separator 13 with the positive and negative electrodes 11 and 12 may be wound together in a jelly-roll shape to form the electrode assembly 10. A front end 10a (FIG. 5) of the electrode assembly 10 is positioned as an innermost end of a wound electrode assembly 10, i.e., an end around which the remaining electrode assembly 10 is wound.

Referring to FIG. 4, the positive electrode 11 may have a structure in which positive electrode active material layers 112 are formed at both sides of a positive electrode current collector 111. In detail, the positive electrode current collector 111 may be formed in a long band shape, and may be made of metal, e.g., aluminum or stainless steel. The positive electrode active material layer 112 may be deposited on opposing surfaces of the positive electrode current collector 111, and may include a positive active material, e.g., $LiCoO_2$, LiMnO$_2$, LiFePO$_4$, LiNiO$_2$, and LiMn$_2$O$_4$, a carbon-based active material, a trivalent active material, etc., and a conductive agent and a binder.

The negative electrode 12 may have a structure in which negative electrode active material layers 122 are formed at both sides of a negative electrode current collector 121. In detail, the negative electrode current collector 121 may be formed in a long band shape, and may be made of a metal, e.g., copper, stainless steel, or aluminum. The negative electrode active material layer 122 may be deposited on opposing surfaces of the negative electrode current collector 121, and may include a negative electrode active material, e.g., Li$_4$Ti$_5$O$_{12}$ or a carbon-based active material, a conductive agent, and a binder.

In further detail, the positive electrode 11 may include a positive electrode coated region 11a (FIG. 5) in which the positive electrode active material layer 112 is formed and a positive electrode uncoated region 11b (FIGS. 3 and 5) in which the positive electrode active material layer 112 is not formed. In other words, the positive electrode current collector 111 is exposed in the positive electrode uncoated region 11b. The positive electrode uncoated region 11b may be formed along a length direction of the positive electrode 11 at one side end of the electrode assembly 10, as illustrated in FIGS. 3 and 5.

Similarly, the negative electrode 12 may include a negative electrode coated region 12a (FIG. 5) in which the negative electrode active material layer 122 is formed and a negative electrode uncoated region 12b (FIG. 5) in which the negative electrode active material layer 122 is not formed. In other words, the negative electrode current collector 121 is exposed in the negative electrode uncoated region 12b.

Figure 5:
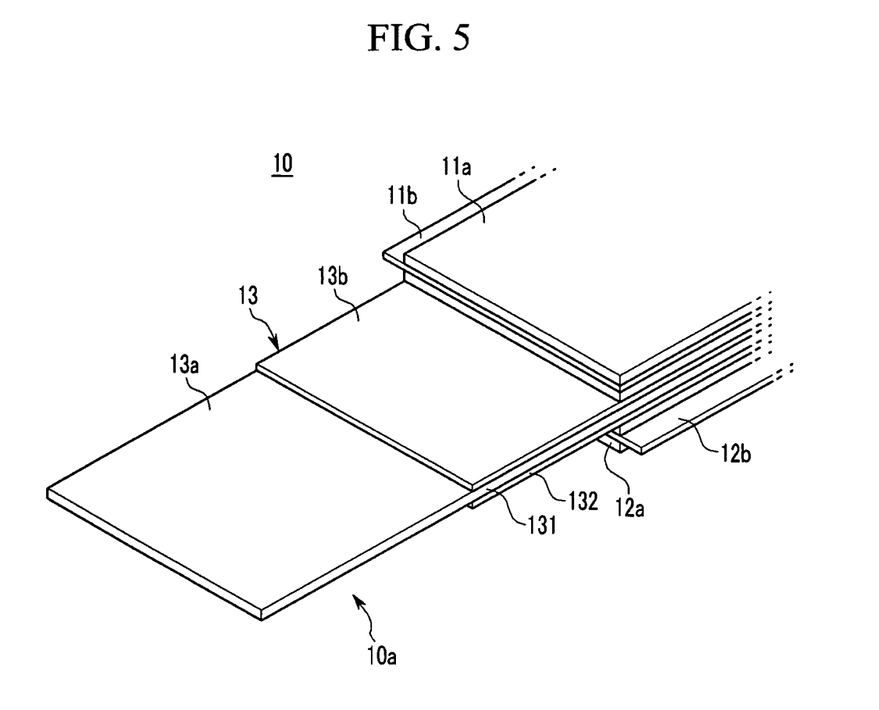
FIG. 5 illustrates a partial perspective view of the electrode assembly before it is wound according to the first exemplary embodiment.

As illustrated in FIGS. 4 and 5, the separator 13 may include a separator member 131 and a heat-resistive layer 132 formed on at least one surface of the separator member 131, e.g., two heat-resistive layers 132 may be formed on respective opposite surfaces of the separator member 131. For example, the heat-resistive layer 132 may be formed only on a first portion of the surface of the separator member 131, i.e., a portion of the separator 13 may include the separator 131 without the heat resistive layer 132 thereon. In detail, as illustrated in FIG. 5, the separator 13 may include a heat-resistive unit 13b and a lubrication unit 13a adjacent to the heat-resistive unit 13b. The heat-resistive unit 13b refers to a region of the separator 13 that includes the heat-resistive layer 132 on the separator member 131, and the lubrication unit 13a refers to a region of the separator 13 including only the separator member 131, i.e., without the heat resistive layer 132. The lubrication unit 13a may have a friction coefficient that is lower than that of the heat-resistive unit 13b, i.e., a friction coefficient of the separator member 131 may be lower than that of the heat-resistive layer 132.

The separator member 131 may include a polymeric porous membrane, and may be made of various materials applied to the separator 13. The heat-resistive layer 132 may be formed of a heat-resistant material, e.g., aramid. The aramid is highly resistive to heat and has excellent ion conductivity and, therefore, may guarantee heat resistance of the separator 13 without deteriorating performance of the separator 13, e.g., as compared to other heat-resistant materials. However, the exemplary embodiment are not limited thereto, and the heat-resistive layer 132 may be made of various materials to be described hereinafter.

The heat-resistive layer 132 may be coated on the separator member 131, and may prevent melting of the separator 13 when the internal temperature of the rechargeable battery 100 is increased. In contrast, when a conventional separator is formed to include only a separator member, e.g., a polymeric porous membrane without a heat-resistive layer thereon, the separator member may melt or contract at a high temperature, e.g., due to overcharge, thereby causing a short circuit between the positive electrode active material layer 112 and the negative electrode active material layer 122 (or between the negative electrode active material layer 122 and the positive electrode current collector 111). When the short circuit occurs between the positive and negative electrodes, a large amount of heat may be generated in the rechargeable battery so that the rechargeable battery may combust or explode. However, the heat-resistive layer 132 on the separator member 131, according to exemplary embodiments, prevents melting of the separator member 131, thereby preventing a short circuit between the positive and negative electrodes 11 and 12.

As described previously, the heat-resistive layer 132 may be formed only on the first portion of the separator member 131. That is, as illustrated in FIG. 5, an edge of the separator 13, i.e., the lubrication unit 13a, may not include the heat-resistive layer 132. Further, the lubrication unit 13a of the separator 13 may be formed at the front end 10a of an unwound electrode assembly 10 to directly contact a winder 40 (FIG. 6) to wound the separator 13 with the positive and negative electrodes 11 and 12 into a wound electrode assembly 10 illustrated in FIG. 3. Attachment of the lubrication unit 13a, i.e. a portion of the separator 13 without the heat-resistive layer 132, to the winder 40 improves separation of the electrode assembly 10 from the winder 40 after the electrode assembly 10 is spirally wound, e.g., a direct contact between the heat-resistive layer 132 and the winder 40 may make the separation of the electrode assembly 10 from the winder 40 difficult due to the high friction coefficient of the heat-resistive layer 132.

Figure 6:
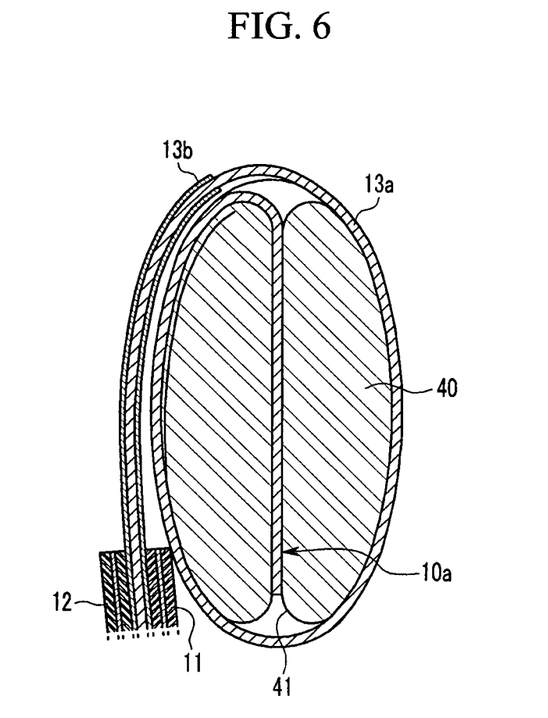
FIG. 6 illustrates a cross-sectional view of the electrode assembly wound around a winder according to the first exemplary embodiment.

In detail, as illustrated in FIG. 6, the winder 40 may have an overall cross-section with a groove 41 at a center thereof, and the electrode assembly 10 may be wound on the external circumferential surface of the winder 40. For example, only the separator 13, i.e., the lubrication unit 13a, may be inserted into the groove 41 and wound on the external circumferential surface of the winder 40. After the separator 13 is partially wound on the winder 40, e.g., the lubrication unit 13a forms one complete circle around the circumference of the winder 40, the heat-resistive unit 13b of the separator, the positive electrode 11, and the negative electrode 12 may be wound on the lubrication unit 13a around the winder 40.

The portion where only the separator 13 is contacting the winder 40 prevents the active material on the electrodes from staining the winder 40. Simultaneously, a direct contact of the lubrication unit 13a of the separator 13 with the winder 40 facilitates separation of the electrode assembly 10 from the winder 40.

For this reason, as illustrated in FIG. 5, the portion where only the separator 13 is located exists at the inner front end 10a of the electrode assembly 10. Since the lubrication unit 13a exists at the portion where only the separator 13 is wound, the lubrication unit 13a and the winder 40 contact each other when being spirally wound. In the lubrication unit 13a, the heat-resistive layer 132 is not formed and the separator member 131 is exposed. The separator member 131 has a friction coefficient that is lower than that of the heat-resistive layer 132, and therefore the lubrication unit 13a may be separated from the winder 40 with ease. For example, the lubrication unit 13a may have a friction coefficient of about 0.3 to about 0.4, and the heat-resistive layer 132 may have a friction coefficient of about 0.5 to about 0.6. For example, the friction coefficient of the lubrication unit 13a may be lower than that of the heat-resistive layer 132 by about 0.1 to about 0.3 in the present exemplary embodiment.

As discussed previously, if a heat-resistive unit having a friction coefficient that is higher than that of a lubrication unit contacts the winder 40, the front end of the separator, i.e., the heat-resistive unit, cannot be easily separated from the winder 40, e.g., the separator may be stuck to the winder, and an internal portion of the electrode assembly 10 may protrude when the electrode assembly 10 is separated from the winder 40. As such, the electrode assembly 10 may deform and necessitate manual correction of the shape of the electrode assembly 10, thereby substantially reducing productivity. This problem occurs because the front end of the electrode assembly 10 cannot be easily slid in the winder 40.

However, in the present exemplary embodiment, the lubrication unit 13a, i.e., where the heat-resistive layer 132 is not formed, may be positioned at the front end 10a of the electrode assembly 10 that contacts the winder 40. As the lubrication unit 13a is easily separated from the winder 40, deformation of the electrode assembly 10 may be prevented. In addition, the heat-resistive unit 13b may be formed at a portion that is adjacent to the lubrication unit 13a, e.g., the heat-resistive unit 13b and lubrication unit 13a may be in direct contact with each other, and the positive electrode 11 and the negative electrode 12 may be arranged to have the heat-resistive unit 13b therebetween. Therefore, a short circuit of the positive electrode 11 and the negative electrode 12 may be prevented when the internal temperature of the rechargeable battery 100 is increased.

Figure 7:
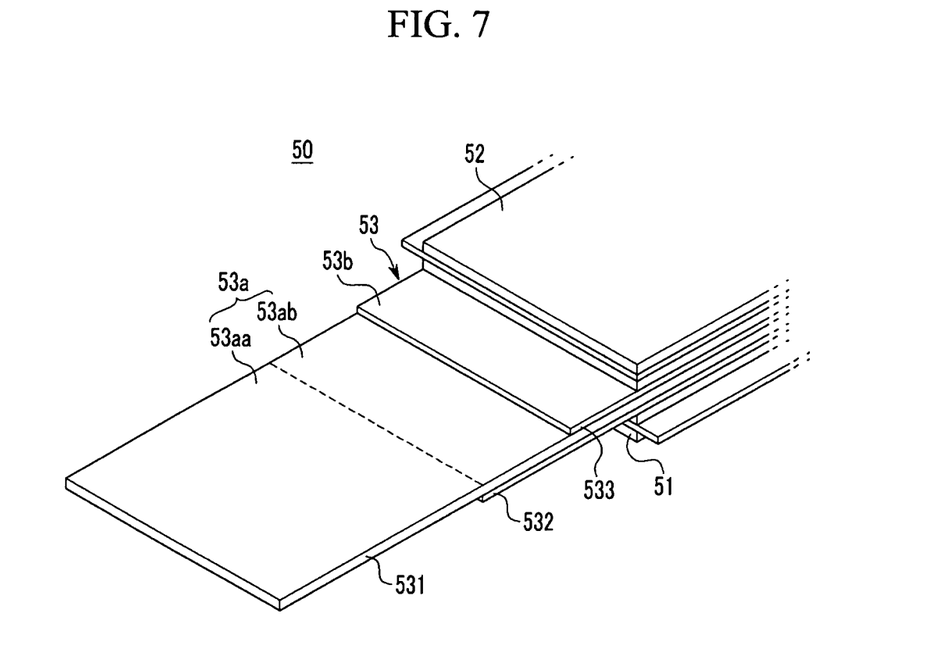
FIG. 7 illustrates a partial perspective view of an electrode assembly of a rechargeable battery according to a second exemplary embodiment.
Figure 8:
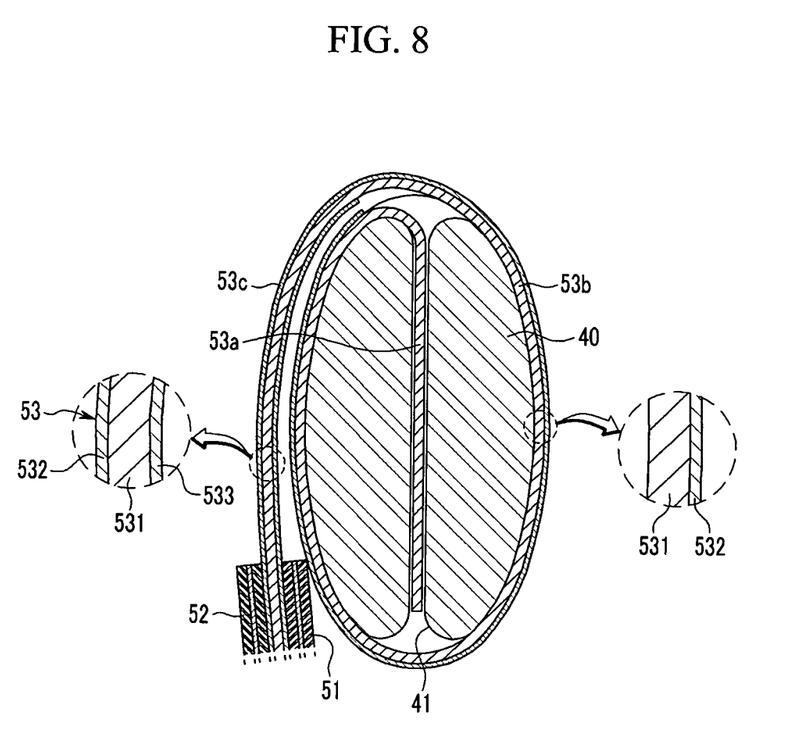
FIG. 8 illustrates a cross-sectional view of an electrode assembly wound around a winder according to the second exemplary embodiment.

FIG. 7 illustrates a partial perspective view of an unwound electrode assembly of a rechargeable battery according to a second exemplary embodiment. FIG. 8 illustrates a cross-sectional view of the electrode assembly of FIG. 7 wound around a winder.

Referring to FIG. 7 and FIG. 8, an electrode assembly 50 according to the present exemplary embodiment may include a positive electrode 51, a negative electrode 52, and a separator 53 disposed between the positive and negative electrodes 51 and 52. The rechargeable battery of the present exemplary embodiment is the same as that of the first exemplary embodiment, with the exception of the structure of the separator 53. Therefore, a detailed description of the same elements will not be repeated.

Referring to FIG. 7, the separator 53 according to the present exemplary embodiment may include a heat-resistive unit 53b having a first heat-resistive layer 532 and a second heat-resistive layer 533 respectively formed on both sides of a separator member 531. Further, the separator 53 may include a lubrication unit 53a having a friction coefficient that is lower than that of the heat-resistive unit 53b. It is noted that the friction coefficient of the heat-resistive unit 53b refers to an average value of friction coefficients of both sides of the separator 53, i.e., of the first and second heat-resistive layers 532 and 533. The first heat-resistive layer 532 and the second heat-resistive layer 533 may be made of, e.g., ceramic, polyvinylidene fluoride (PVDF), or PVDF-HFP.

The lubrication unit 53a may include a first lubrication unit 53aa and a second lubrication unit 53ab adjacent to the first lubrication unit 53aa. The first lubrication unit 53aa refers to a region of the separator 53 where both sides of the separator member 531 are exposed. The second lubrication unit 53ab refers to a region of the separator 53 where only one side, i.e., surface, of the separator member 531 is exposed, i.e., the second lubrication unit 53ab is formed only on one surface of the separator member 531. The first heat-resistive layer 532 may extend on a surface of the separator member 531 that is opposite the second lubrication unit 53ab. Further, the first heat-resistive layer 532 may overlap the second lubrication unit 53ab. Therefore, the second lubrication unit 53ab may have a friction coefficient that is lower than that of the heat-resistive unit 53b and higher than that of the first lubrication unit 53aa.

A illustrated in FIG. 8, the first lubrication unit 53aa may be inserted into the groove 41 formed in the winder 40, such that both sides thereof contact the winder 40, and one side of the second lubrication unit 53ab contacts the external surface of the winder 40. As described, according to the present exemplary embodiment, the heat-resistive layers 532 and 533 may not be formed in the portion of the separator 53 contacting the winder 40. Thus, the electrode assembly 10 may be easily separated from the winder 40 after spiral-winding is finished. In addition, the second heat-resistive layer 533 may be formed at one side of the second lubrication unit 53ab, so that the strength of the second lubrication unit 53ab may be improved. Accordingly, deformation of the second lubrication unit 53ab may be prevented.

Figure 9:
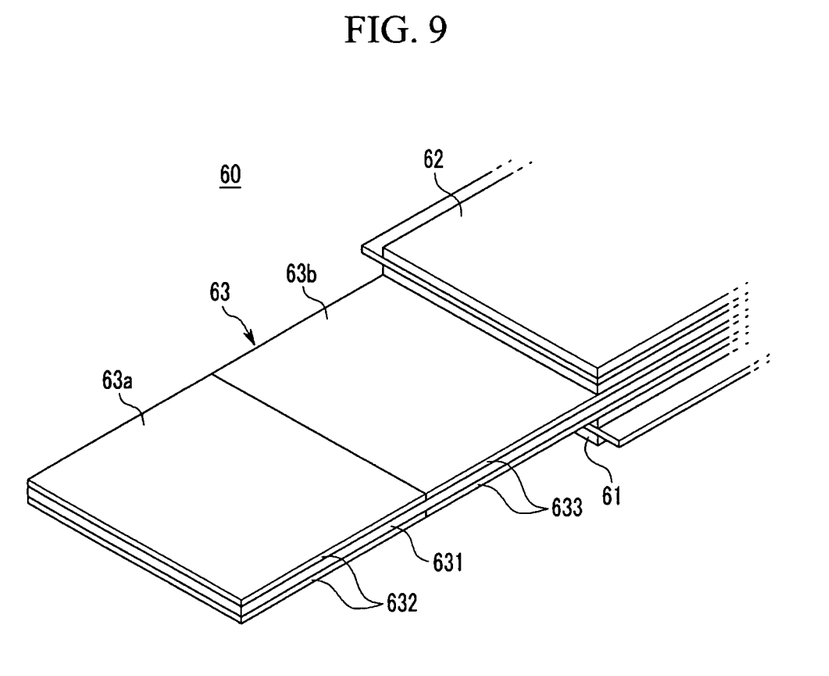
FIG. 9 illustrates a partial perspective view of an electrode assembly of a rechargeable battery according to a third exemplary embodiment.

FIG. 9 illustrates a partial perspective view of an unwound electrode assembly of a rechargeable battery according to a third exemplary embodiment. Referring to FIG. 9, an electrode assembly 60 according to the present exemplary embodiment may include a positive electrode 61, a negative electrode 62, and a separator 63 disposed between the positive and negative electrodes 61 and 62. The rechargeable battery according to the present exemplary embodiment is the same as that of the first exemplary embodiment, with the exception of the structure of the separator 63. Therefore, detailed descriptions of the same elements will not be repeated.

The separator 63 according to the present exemplary embodiment may include a heat-resistive unit 63b having a heat-resistive layer 633 formed at both sides of a separator member 631, and a lubrication unit 63a having a friction coefficient that is lower than that of the heat-resistive unit 63b. The heat-resistive layer 633 may be coated over both sides of the separator member 631 in the heat-resistive unit 63b. The heat-resistive layer 633 may be made of, e.g., an aramid, ceramic, PVDF, PVDF-HFP, etc.

In the lubrication unit 63a, a lubrication layer 632 may be coated over both sides of the separator member 631. The lubrication layer 632 may include a material having a friction coefficient that is lower than that of the separator member 631. The lubrication layer 632 may be made of a solid, e.g., a polymer material, and may have a structure in which a liquid, e.g., a lubrication solution that does not react with an electrolyte solution, may be coated thereon. The lubrication layer 632 may be located at the front end of the electrode assembly 60. Thus, the lubrication layer 632 may contact the winder when being spirally wound. In this case, the lubrication layer 632 may have a friction coefficient of about 0.1 to about 0.3 for separation from the winder with ease. In the present exemplary embodiment, the spirally-wound electrode assembly 60 may be easily separated from the winder by forming the lubrication layer 632 having a friction coefficient that is lower than that of the separator 631.

Figure 10:
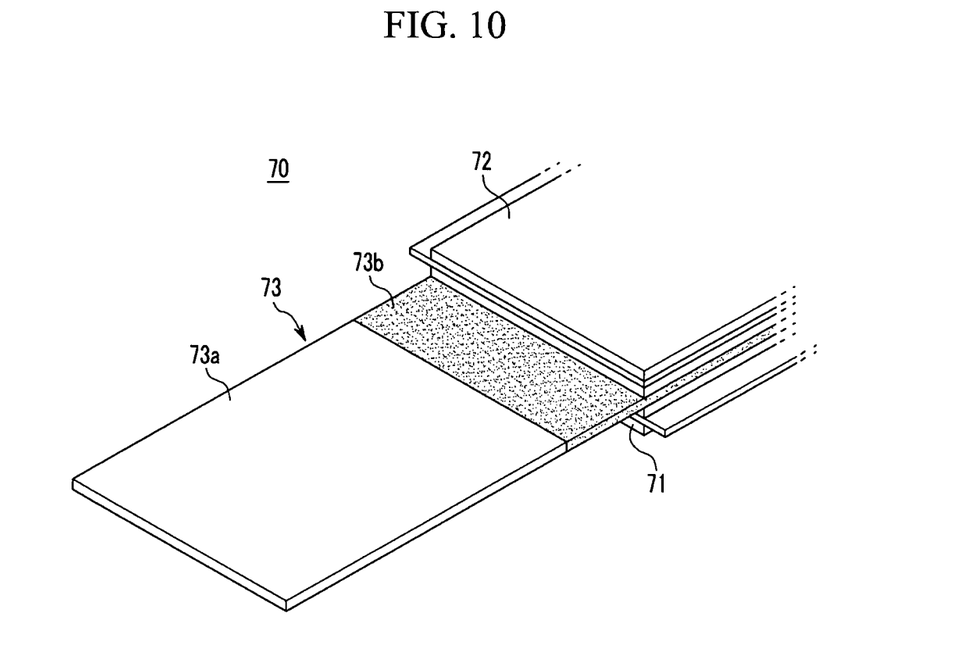
FIG. 10 illustrates a partial perspective view of an electrode assembly of a rechargeable battery according to a fourth exemplary embodiment.

FIG. 10 illustrates a partial perspective view of an electrode assembly of a rechargeable battery according to a fourth exemplary embodiment. Referring to FIG. 10, an electrode assembly 70 according to the present exemplary embodiment may include a positive electrode 71, a negative electrode 72, and a separator 73 disposed between the positive and negative electrodes 71 and 72. The rechargeable battery of the present exemplary embodiment is the same as that of the first exemplary embodiment, with the exception of the structure of the separator 73, and therefore, detailed descriptions of the same elements will not be repeated.

The separator 73 according to the present exemplary embodiment may include a heat-resistive unit 73b where a heat-resistive material is embedded in a separator member, and a lubrication unit 73a having a friction coefficient that is lower than that of the heat-resistive unit 73b. A material embedded in the heat-resistive unit 73b, e.g., a ceramic material, may be more heat-resistive than the separator member. When the heat-resistive material is embedded in the separator member, heat-resistivity of the separator 73 is increased. Thus, the separator 73 may be prevented from being melted at a high temperature, thereby improving stability of the rechargeable battery.

The heat-resistive material is not embedded in the separator member located in the lubrication unit 73a. Accordingly, a friction coefficient of the lubrication unit 73a may be lower than that of the heat-resistive unit 73b. Since the positive electrode 71 and the negative electrode 72 are not stacked in the lubrication unit 73a, the positive electrode 71 and the negative electrode 72 may not be short-circuited when the lubrication unit 73a is melted at a high temperature. Accordingly, stability may not be deteriorated. In addition, only a lubrication unit may be located at the front end of the separator 73 to contact the winder when being spirally wound. Accordingly, the electrode assembly 70 may be easily separated from the winder after the spiral-winding.

According to the exemplary embodiments, a separator of an electrode assembly may include a heat-resistive unit that prevent melting of the separator at high temperatures. Accordingly, an internal short-circuit between the electrodes of the electrode assembly may be prevented, thereby improving stability. In addition, the separator of the electrode assembly may include a lubrication unit that may easily separate the electrode assembly from a winder, thereby improving productivity.

| <Description of symbols> | |
|---|---|
| 100: rechargeable battery | 10, 50, 60, 70: electrode assembly |
| 11, 51, 61, 71: positive electrode | |
| 111: positive electrode current collector | |
| 112: positive electrode active material layer | |
| 11a: positive electrode coated region | |
| 11b: positive electrode uncoated region | |
| 12, 52, 62, 72: negative electrode | |
| 121: negative electrode current collector | |
| 122: negative electrode active material layer | |
| 12a: negative electrode coated region | |
| 12b: negative electrode uncoated region | |
| 13, 53, 63, 73: separator | 131, 531, 631: separator member |
| 132, 633: heat-resistive layer | 13a, 53a, 63a, 73a: lubrication unit |
| 13b, 53b, 63b, 73b: heat-resistive unit | |
| 20: cap assembly | 22: negative terminal |
| 24: washer | 25: upper gasket |
| 26: insulating member | 27: electrolyte solution injection hole |
| 28: lower gasket | |
| 29: nut | 30: cap plate |
| 31: first lead tab | 32: second lead tab |
| 34: case | 38: sealing cap |
| 39: vent plate | 39a: notch |
| 40: winder | 41: groove |
| 532: first heat-resistive layer | 533: second heat-resistive layer |
| 53aa: first lubrication unit | 53ab: second lubrication unit |
| 632: lubrication layer | |

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electrode assembly, comprising:
   a positive electrode including a positive electrode current collector and a positive electrode active material layer on the positive electrode current collector;
   a negative electrode including a negative electrode current collector and a negative electrode active material layer on the negative electrode current collector; and
   a separator between the positive and negative electrodes, the separator including a heat-resistive unit and a lubrication unit, the heat-resistive unit having a heat-resistive material, and the lubrication unit having a friction coefficient that is lower than that of the heat-resistive unit,
   wherein the lubrication unit is at an inner front end of the separator, the lubrication unit extending beyond an inner front end of each of the positive and negative electrodes, the inner front ends of the separator, positive electrode, and negative electrodes facing a same direction, and
   wherein a portion of the heat-resistive unit of the separator extends beyond the inner front end of each of the positive and negative electrodes along a winding direction of the electrode assembly, the lubrication unit extending beyond an edge of the heat-resistive unit along the winding direction of the electrode assembly.

2. The electrode assembly as claimed in claim 1, wherein the heat-resistive material is an aramid.

3. The electrode assembly as claimed in claim 1, wherein the heat-resistive material includes at least one of ceramic, PVDF, and PVDF-HFP.

4. The electrode assembly as claimed in claim 1, wherein the separator includes a separator member and a first heat-resistive layer on a portion of the separator member, the first heat-resistive layer being in the heat-resistive unit, and the separator member including a polymeric porous membrane.

5. The electrode assembly as claimed in claim 4, wherein the lubrication unit includes a portion of the separator member without the first heat-resistive layer.

6. The electrode assembly as claimed in claim 5, further comprising a lubrication layer in the lubrication unit, the lubrication layer having a friction coefficient that is lower than that of the separator member.

7. The electrode assembly as claimed in claim 4, wherein:
   the separator further comprises a second heat-resistive layer on a portion of the separator member, the first and second heat-resistive layers being on opposite surfaces of the separator member; and
   the lubrication unit includes a first lubrication unit and a second lubrication unit, the first lubrication unit including a portion of the separator member without the first or second heat-resistive layers, and the second lubrication unit including only one of the first and second heat-resistive layers.

8. The electrode assembly as claimed in claim 1, wherein the heat-resistive material is embedded in the heat-resistive unit.

9. The electrode assembly as claimed in claim 1, wherein a friction coefficient of the lubrication unit is lower than that of the heat-resistive unit by about 0.1 to about 0.3.

10. A rechargeable battery, comprising:
an spirally winding electrode assembly having a positive electrode, a negative electrode, and a separator between the positive and negative electrodes;
a case in which the electrode assembly is installed; and
a terminal electrically connected to the electrode assembly and externally protruding from the case,
wherein the separator includes a heat-resistive unit and a lubrication unit, the heat-resistive unit having a heat-resistive material, and the lubrication unit being at an inner front end of the separator and having a friction coefficient that is lower than that of the heat-resistive unit,
wherein the positive electrode includes a positive electrode current collector and a positive electrode active material layer on the positive electrode current collector, and the negative electrode includes a negative electrode current collector and a negative electrode active material layer on the negative electrode current collector,
wherein the lubrication unit is at an inner front end of the separator, the lubrication unit extending beyond an inner front end of each of the positive and negative electrodes, the inner front ends of the separator, positive electrode, and negative electrodes facing a same direction, and
wherein a portion of the heat-resistive unit of the separator extends beyond the inner front end of each of the positive and negative electrodes along a winding direction of the electrode assembly, the lubrication unit extending beyond an edge of the heat-resistive unit along the winding direction of the electrode assembly.

11. The rechargeable battery as claimed in claim 10, wherein the heat-resistive material is an aramid.

12. The rechargeable battery as claimed in claim 10, wherein the heat-resistive material includes at least one of ceramic, PVDF, and PVDF-HFP.

13. The rechargeable battery as claimed in claim 10, wherein the separator includes a separator member and a first heat-resistive layer on a portion of the separator member, the first heat-resistive layer being in the heat-resistive unit, and the separator member including a polymeric porous membrane.

14. The rechargeable battery as claimed in claim 13, wherein the lubrication unit includes a portion of the separator member without the first heat-resistive layer.

15. The rechargeable battery as claimed in claim 14, further comprising a lubrication layer in the lubrication unit, the lubrication layer having a friction coefficient that is lower than that of the separator member.

16. The rechargeable battery as claimed in claim 13, wherein:
the separator further comprises a second heat-resistive layer on a portion of the separator member, the first and second heat-resistive layers being on opposite surfaces of the separator member; and
the lubrication unit includes a first lubrication unit and a second lubrication unit, the first lubrication unit including a portion of the separator member without the first or second heat-resistive layers, and the second lubrication unit including only one of the first and second heat-resistive layers.

17. The rechargeable battery as claimed in claim 10, wherein the heat-resistive material is embedded in the heat-resistive unit.

18. The rechargeable battery as claimed in claim 10, wherein a friction coefficient of the lubrication unit is lower than that of the heat-resistive unit by about 0.1 to about 0.3.

19. The electrode assembly as claimed in claim 1, wherein uncoated portions of the positive and negative electrodes extend in directions other than that of the inner front ends of the positive and negative electrodes.

* * * * *